June 6, 1967  J. E. COTTLE  3,323,730
CRYSTAL PURIFICATION METHOD AND APPARATUS THEREFOR
Filed May 16, 1963  2 Sheets-Sheet 1

INVENTOR.
J. E. COTTLE
BY *Young & Quigg*

ATTORNEYS

June 6, 1967 J. E. COTTLE 3,323,730
CRYSTAL PURIFICATION METHOD AND APPARATUS THEREFOR
Filed May 16, 1963 2 Sheets-Sheet 2

INVENTOR
J. E. COTTLE
BY Young & Quigg
ATTORNEYS

United States Patent Office 3,323,730
Patented June 6, 1967

3,323,730
CRYSTAL PURIFICATION METHOD AND
APPARATUS THEREFOR
John E. Cottle, Bartlesville, Okla., assignor to Phillips
Petroleum Company, a corporation of Delaware
Filed May 16, 1963, Ser. No. 280,952
2 Claims. (Cl. 241—92)

This invention relates to the separation and purification of components of a liquid multi-component mixture by crystallization. In another aspect, this invention relates to a method and apparatus for crystal separation and purification of liquid multi-component mixtures.

The separation of chemical compounds by means of crystallization finds many applications in industrial installations. While separation by distillation or solvent extraction seems to be generally preferred, there are cases when these methods are impractical or impossible and the desired separation can be effected only by means of crystallization. Thus when confronted with chemical isomers having similar boiling points and solubilities, or with materials having relatively high boiling ranges or with thermally unstable substances or with solutions containing both volatile and non-volatile impurities or undesired constituents, separation by crystallization may be the only method which can be advantageously employed. In one method of crystal separation a liquid multi-component mixture is cooled so as to form crystals of at least a higher melting component and the crystals are thereafter separated from the mother liquor and introduced into a purification column through which they are moved in a compact contiguous mass. During their passage through the column, the crystals are refluxed by melting a portion of the crystals in a melting section near the outlet of the purification column. When this method of refluxing is employed, a portion of the melted crystals is withdrawn as product while the remainder of the melt is forced countercurrently to the movement of the crystals and in contact therewith so as to remove occluded impurities therefrom.

A problem associated with this type of crystallization method and apparatus lies in providing effective reflux of the crystal mass to remove occluded mother liquor therefrom. As the refluxing liquid contacts the crystals within the crystal mass, part of the high purity reflux liquid freezes and part of the impure crystals melt, the amount of freezing and melting determined by heat balance and equilibrium relationships. The desired degree of crystal purification is attained by controlling the amount of refreezing of the reflux liquid. Sufficient reflux liquid must be refrozen to substantially fill the void spaces and crystal interstices so as to displace the occluded mother liquor impurities therefrom. The quantity of reflux liquid that must be refrozen depends upon the crystal size and shape.

It is desirable that only so much of the reflux liquid required to fill the void spaces and crystal interstices refreeze. If a greater quantity of the reflux liquid refreezes, channelling will occur in the crystal bed and purity of the product crystals is greatly decreased. It has been discovered that effective control of refluxing and refreezing can be obtained by controlling the temperature of the reflux liquid.

Accordingly, an object of my invention is to provide an improved apparatus for separating the components of a liquid multi-component mixture by crystallization.

Another object of my invention is to provide an improved apparatus for recovering the crystals formed in a crystallization process.

Another object of my invention is to provide an improved apparatus for refluxing the crystals formed in a crystallization process.

Other objects, advantages and features of my invention will be readily apparent to those skilled in the art from the following description and the appended claims.

Figure 1:
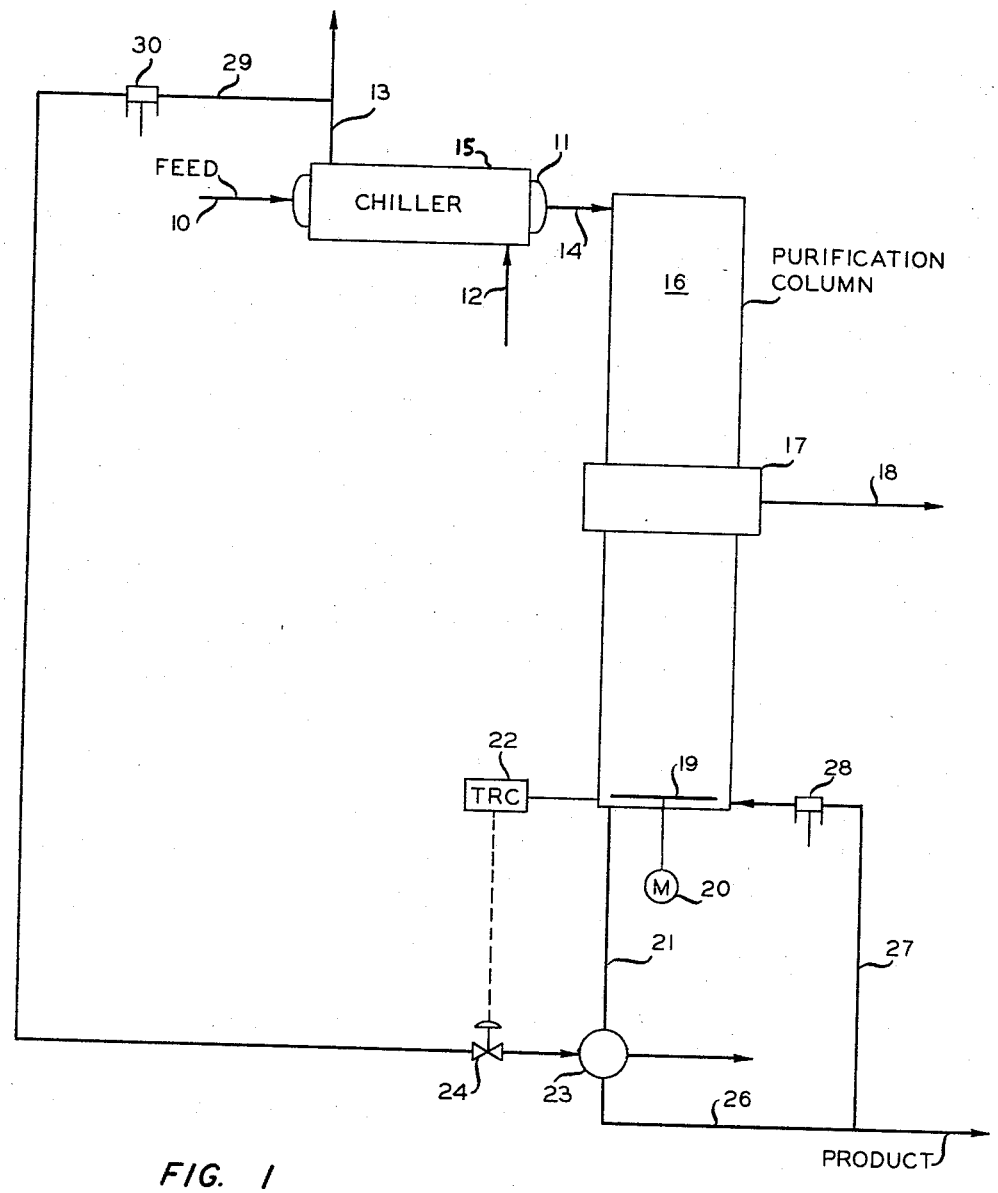
FIGURE 1 is a schematic representation of one embodiment of the inventive process.

Referring now to FIGURE 1, a feed mixture comprising two or more components, one of which is separable from the mixture by crystallization, is passed through conduit means 10 into chiller 11. Chiller 11 can comprise a conventional means, such as a scraped surface chiller, for chilling the feed mixture so as to form a slurry comprised of crystals and mother liquor. As illustrated, chiller 11 is surrounded by a cooling jacket 15 having a coolant inlet conduit 12 and a coolant outlet conduit 13. Within chiller 11, crystals are formed so as to form a crystal slurry which contains normally from about 20 to about 60 weight percent solids. While it is desirable to concentrate as much as possible the formation of crystal solids, if the solids content is too high the slurry becomes quite stiff and becomes too difficult to pass from the chiller.

The slurry of crystals is passed via conduit means 14 to crystal purification column 16. Crystal purification column 16 can be a piston-type column substantially as described in the patent to Schmidt, Re. 23,810, or a pulse-type column as described in the patent to R. W. Thomas, 2,854,494, with specific modifications as hereinafter described. In either type of column, a compacted mass of crystals is forced through the column; a filter section 17 is provided in an intermediate portion in the purification column 16 so that mother liquor can be withdrawn through conduit 18 from the column and separated from the crystals; and the compacted mass of crystals is refluxed with a liquid passed countercurrently through the mass of crystals. Whereas the purification column of Schmidt and the purification column of Thomas provide a means of heating the crystal mass in the downstream region of the column, thereby providing a reflux liquid and providing for the withdrawal of the crystals from the purification column as a liquid melt, I have provided a method of and apparatus for withdrawing the formed crystals from purification column 16 without transforming the solid crystals to liquid melt.

Figure 2:
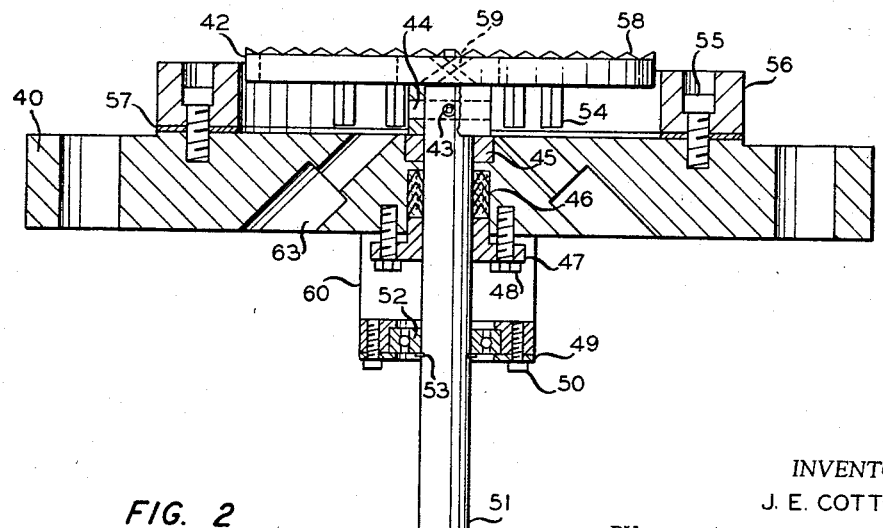
FIGURE 2 is an elevated cross-sectional view of the inventive crystal cutter.

The compacted mass of crystals is brought into contact with a cutter 19 positioned in the downstream region of column 16. Referring to FIGURE 2, it is seen that cutter 19 is comprised of a circular-plate member 42 having serrated cutting teeth or edges 58 extending outwardly from a surface of plate member 42. These cutting edges 58 are brought into contact with the contiguous mass of crystals in the downstream region of column 16. By referring to FIGURE 3, it can be seen that cutting teeth 58 form a four-pronged cutting surface. Circular-plate member 42 is mounted upon a rotating shaft 51 and maintained in fixed relationship to shaft 51 by means of pin member 44 and set screw member 43. Shaft 51 is rotated by a conventional motor means 20.

Upon rotation of circular-plate member 42 in contact with the crystal mass, crystal particles or cuttings are separated from the crystal mass and passed through circular-plate member 42 via channels or passageways 59 positioned adjacent cutting teeth 58.

Shaft 51 passes through cover plate member 40. Positioned within cover plate member 40 and surrounding shaft 51 is a bearing 45. To prevent the leakage of fluid from within column 16 packing 46 is positioned within cover plate member 40 and around shaft 51. A packing follower 47 is positioned adjacent packing 46 with the pressure exerted by packing follower 47 upon packing 46 determined by the positioning of screw member 48. A bearing 52 positioned around shaft 51 is held in place by a bearing retainer 49, bearing housing 60 and screw members 50. A retaining ring 53 is positioned about shaft 51.

A gasket 57 is positioned between cover plate member 40 and ring 56. Ring 56 is attached to cover plate member 40 by means of threaded screw members 55. Channel means or passageways 62 are positioned throughout the periphery of ring 56. Channel means or passageways 63 are positioned in cover plate member 40 to permit the passage of crystals from purification column 16.

Figure 3:
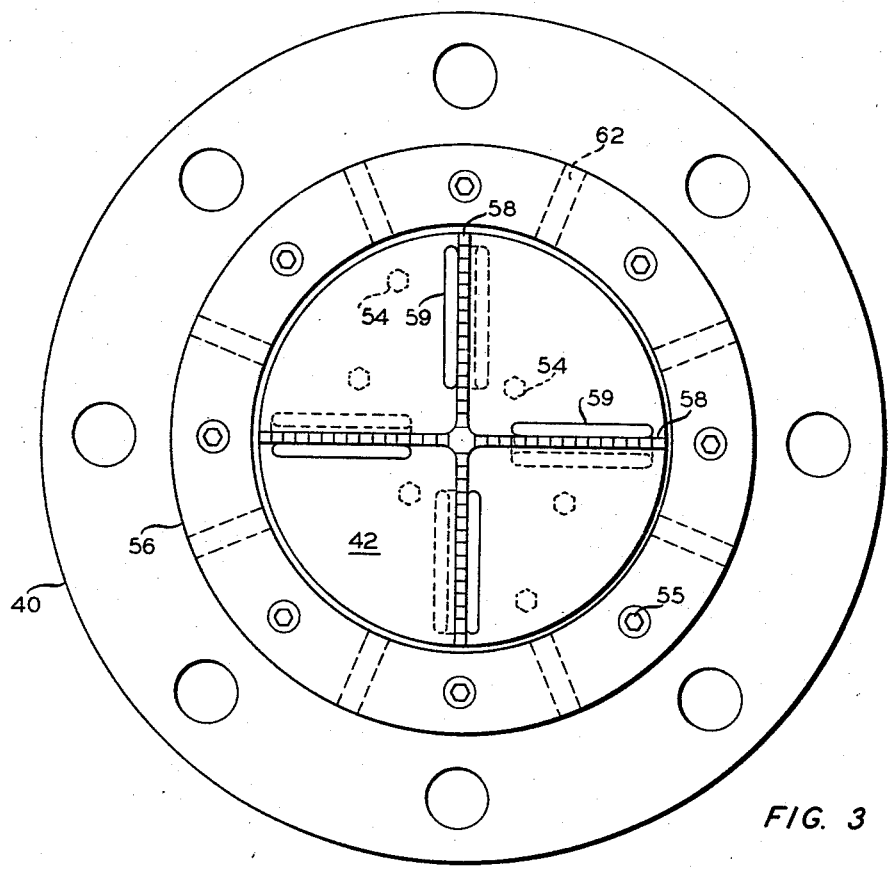
FIGURE 3 is a top view of the crystal cutter of FIGURE 2.

Referring again to FIGURE 1, as the cuttings pass through the cutter they are contacted with a liquid, hereinafter described, passed to column 16 via conduit means 27 and pumping means 28. The liquid is dispersed throughout the cross section of column 16 by passing the said liquid through the multiple passageways 62 (FIGURE 3). A portion of the said liquid flows upstream countercurrently to the moving crystal mass as reflux. The remainder of the said liquid carries the cuttings forth as suspended particles from column 16 via passageways 63 and conduit means 21. Depending from circular-plate member 42 are multiple fingers 54 which upon the rotation of plate member 42 thoroughly mix the liquid recycled to column 16 and the cuttings, preventing the buildup of crystals below circular-plate member 42 in "dead" areas with channelling of the recycled liquid resulting therefrom.

The liquid and cuttings mixture withdrawn from column 16 via conduit means 21 is passed to a heat exchange means 23 such as a conventional U-tube heat exchanger. Within heat exchange means 23 the cuttings are melted and the liquid melt withdrawn from heat exchange means 23 via conduit means 26.

As previously noted, purity of the product crystals and overall efficiency of the crystallization process is substantially increased by refluxing the crystal mass with a liquid comprising melted crystals. As the refluxing liquid contacts the crystals within the crystal mass, part of the high purity reflux liquid refreezes. It has been discovered that by controlling the temperature of the reflux liquid the quantity of reflux liquid that refreezes can be closely controlled. This results in higher crystal product purity and a crystallization process of increased efficiency.

When by the conventional process the crystals are melted in the downstream region of the purification column and a portion of the melt is forced upstream countercurrently to the crystal mass, the step of melting the crystals to recover the crystals as liquid melt and the refluxing step are interdependent. Sufficient heat must be supplied to the melting zone to melt all of the crystals and prevent buildup of crystals in the melting zone. The temperature of the reflux liquid and thus the efficiency of the refluxing step is dependent upon the melting step as the heat supplied in the melting step must necessarily directly affect the temperature of the refluxing liquid. If, for example, it is necessary to supply heating fluid at a temperature of 200° F. to a heating coil positioned in the melting zone, then at least a portion of the reflux liquid will have an initial temperature approaching 200° F., whereas it may be desirable to maintain a reflux liquid temperature of 50° F.

By my invention, I separate the melting and refluxing steps so as to make each step independent of the other. Referring to FIGURE 1, a portion of the liquid melt withdrawn from heat exchange means 23 is recycled via conduit means 26, conduit means 27 and pumping means 28 to purification column 16 as reflux. The liquid temperature in the purification zone is sensed or measured and the temperature of the reflux liquid recycled via conduit means 27 to purification column 16 is controlled responsive thereto by passing a signal representative of the said temperature measurement to a conventional temperature-recorder-controller 22. Controller 22 opens and closes valve means 24, thereby manipulating the flow of heating medium to heat exchange means 23 via conduit means 29 and controlling the temperature of the liquid melt withdrawn from heat exchange means 23 via conduit means 26. The rate of withdrawal of product from the process can be controlled by a conventional flow controller positioned downstream of conduit means 27.

By my invention I have reduced the input energy requirements of a conventional crystallization process and thus have substantially increased the efficiency of the crystallization process. Referring to FIGURE 1, at least a portion of a vaporous cooling medium withdrawn from chiller 11 via conduit means 13 is passed via conduit means 29 and compressor means 30 to heat exchange means 23. The remainder of the cooling medium can be passed to other compression and condensation means not herein illustrated. Within heat exchange means 23, heat is indirectly transferred to the liquid and cuttings mixture passed to heat exchange means 23 via conduit means 21. In the operation of a conventional purification column with a melt section in the downstream region of the column, it would not be possible to employ the coolant withdrawn from the chilling step to melt the crystals because the heat transfer surface in the melt section of the column is restricted. By removing the melting zone from the purification column, the melting zone can be sized independent of any effect upon the refluxing step and purification step.

Although as herein illustrated, the rate of flow of heating medium to heat exchange means 23 is manipulated responsive to the temperature measurement within column 16, it is within the scope of this invention to control the temperature of the reflux liquid by other means such as manipulating the temperature of the heat exchange medium passed to heat exchange means 23.

The inventive process is applicable to any crystallization process employed in the separation of liquid multi-component mixtures by crystallization. It is particularly applicable to the separation of aqueous solutions such as fruit juices, vegetable juices, wine, beer, milk and the like by crystallization.

The advantage of the inventive process are illustrated by the following example.

*Example*

The amount of refreezing in the purification zone can be calculated by the following heat balance equation:

$$R = \frac{100 Cp_s (T_p - T_s)}{\Delta H_f + Cp_L (T_M - T_p)}$$

where:

$R$=refreezing ratio lb. of reflux liquid frozen per 100 lb. of crystals entering the column
$Cp_s$=specific heat of crystals, B.t.u./lb./° F.
$T_p$=product melting point, ° F.
$T_s$=temperature of crystals entering column, ° F.
$T_M$=temperature of reflux liquid, ° F.
$\Delta H_f$=latent heat of fusion of melt, B.t.u./lb./° F.
$Cp_L$=average specific heat of liquid, B.t.u./lb./° F.

In the purification of p-xylene, a xylene feedstock containing 65.0 weight percent p-xylene, the remainder being o-xylene and n-xylene, is fed to chiller 11 at the rate of 200 pounds per hour. The feed is cooled to 0° F. in the chiller thereby producing a slurry containing 40 weight percent p-xylene crystals.

The crystal slurry is passed into a purification column 16 and mother liquor is remover through filter 17 at the rate of 160 pounds per hour. Forty pounds per hour of the xylene crystals is withdrawn via conduit means 21 and melted within heat exchange means 23.

When operating according to a conventional crystallization process and melting the crystals in the downstream region of column 16, the temperature of the reflux liquid in the base of column 16 is found to be 760° F. The amount of refreezing of reflux liquid is calculated to be $$R\frac{100(0.50)(56-0)}{70.7+0.4(76-56)}$$

where:

0.50=specific heat of p-xylene crystals
0.4=specific heat of p-xylene liquid
56=melting point of p-xylene, ° F.
0=slurry temperature, ° F.
76=reflux temperature, ° F.
70.7=heat of fusion of p-xylene, B.t.u./lb.
$R$=35.6 lb. of reflux refrozen per 100 lb. of crystal feed.

Performance of the column is poor under the above conditions as too much reflux is being frozen for optimum operation and p-xylene product purity is low.

Heat is now supplied to heat exchange means 23 until the temperature of the liquid melt withdrawn from heat exchange means 23 via conduit means 26 is 126° F. The amount of reflux refrozen is now $$R=\frac{100(0.50)[56-0]}{70.7+0.4[156-56]}$$

$R$=25.3 lb. of reflux refrozen per 100 lb. of crystal feed.

At this reduced amount of refreezing, column performance is found to be at an optimum. p-Xylene product purity is raised to 99+ weight percent. Column throughout and therefore process efficiency is also raised to a maximum.

Reasonable modifications and variations are possible in view of the foregoing discussion and disclosure without departing from the spirit or scope thereof.

I claim:

1. Apparatus comprising an elongated cylindrical housing equipped with a flat lower portion perpendicular to the axis of said cylindrical housing, said flat lower portion containing a passageway; said housing also containing a passageway in the upper portion thereof; a rotating circular plate member substantially the same size as the inner portion of said cylindrical housing so as to prevent cut matter from passing between said circular plate and said housing, said circular plate positioned above said lower passageway; said circular plate rotating in a plane perpendicular to the axis of the cylindrical housing; said circular plate member containing four serrated cutting means, each extending vertically from said rotating circular plate member and each oriented radially from the center of said plate to the circumference of said plate; said plate containing four slot-like passageways, each passageway being elongated and radially positioned immediately adjacent to a separate serrated cutting means, each passageway being further positioned obliquely so as to transport cut matter therethrough.

2. The apparatus of claim 1 further comprising said plate containing at least one cylindrical finger protruding from the side of the plate not containing said radial cutting means; wherein each cylindrical finger is oriented perpendicular to the plane in which said rotor plate rotates; wherein said cylindrical fingers are of such lengths as to extend from said plate downward virtually to said flat lower portion containing said passageway, said fingers thereby effecting a mixing action on the cut matter that is passed through said slot-like passageways, said mixed cut matter then exiting from said housing via said passageway in the lower portion thereof.

References Cited

UNITED STATES PATENTS

| | | | |
|---|---|---|---|
| 2,044,563 | 6/1936 | Carter | 241—38 |
| 2,044,564 | 6/1936 | Carter | 241—38 |
| 2,561,043 | 7/1951 | Ayers | 241—38 X |
| 2,873,663 | 2/1959 | Hawk | 241—65 X |
| 2,895,689 | 7/1959 | Edwards | 241—65 X |
| 2,912,174 | 11/1959 | Bidwell | 241—15 |
| 2,947,486 | 8/1960 | Higer | 241—46 X |
| 2,960,324 | 11/1960 | Culp | 241—65 X |
| 2,984,992 | 5/1961 | Wenzelberger | 62—123 |
| 3,004,397 | 10/1961 | Wenzelberger | 62—123 |
| 3,014,671 | 12/1961 | Thompson | 241—296 |
| 3,017,127 | 1/1962 | Idzi | 241—259 |
| 3,098,733 | 7/1963 | Rosenstein | 62—58 |
| 3,121,627 | 2/1964 | Harris | 62—58 |
| 3,128,051 | 4/1964 | Smith | 241—46 |
| 3,181,801 | 5/1965 | Lung | 241—46 X |

WILLIAM W. DYER, JR., *Primary Examiner.*

NORMAN YUDKOFF, *Examiner.*

H. F. PEPPER, JR., *Assistant Examiner.*